United States Patent
Joo et al.

(10) Patent No.: US 9,765,232 B2
(45) Date of Patent: *Sep. 19, 2017

(54) SOLVENTLESS COMPOSITION AND METHOD FOR PREPARING THE SAME

(71) Applicant: LG CHEM, LTD., Seoul (KR)

(72) Inventors: Hyo Sook Joo, Daejeon (KR); Jung Sup Shim, Daejeon (KR); Se-Ra Kim, Daejeon (KR); Suk Ky Chang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 193 days.

This patent is subject to a terminal disclaimer.

(21) Appl. No.: 13/966,796

(22) Filed: Aug. 14, 2013

(65) Prior Publication Data

US 2014/0044959 A1 Feb. 13, 2014

Related U.S. Application Data

(63) Continuation of application No. PCT/KR2012/001112, filed on Feb. 14, 2012.

(30) Foreign Application Priority Data

Feb. 14, 2011 (KR) .................. 10-2011-0012987
Feb. 14, 2012 (KR) .................. 10-2012-0014764

(51) Int. Cl.
| | | |
|---|---|---|
| *C09D 133/08* | (2006.01) | |
| *C09J 7/00* | (2006.01) | |
| *C09J 133/08* | (2006.01) | |
| *C08F 20/10* | (2006.01) | |
| *C08F 20/18* | (2006.01) | |
| *C09D 4/00* | (2006.01) | |
| *C08F 220/18* | (2006.01) | |
| *C09J 7/02* | (2006.01) | |
| *C09J 133/10* | (2006.01) | |
| *C08F 220/32* | (2006.01) | |

(52) U.S. Cl.
CPC ............ *C09D 133/08* (2013.01); *C08F 20/10* (2013.01); *C08F 20/18* (2013.01); *C08F 220/18* (2013.01); *C09D 4/00* (2013.01); *C09J 7/0217* (2013.01); *C09J 7/0267* (2013.01); *C08F 2220/325* (2013.01); *C09J 133/08* (2013.01); *C09J 133/10* (2013.01); *C09J 2201/606* (2013.01); *C09J 2433/006* (2013.01); *Y10T 428/2809* (2015.01)

(58) Field of Classification Search
CPC .. C09D 133/08; C09D 133/10; C09D 133/12; C09J 7/0217; C09J 7/0267; C09J 133/08; C09J 133/10; C09J 133/12; C08F 20/10; C08F 20/18; C08F 220/10; C08F 220/18
USPC ..................................... 525/242, 244, 330.3
See application file for complete search history.

(56) References Cited

U.S. PATENT DOCUMENTS

| | | |
|---|---|---|
| 6,682,872 B2 | 1/2004 | Sachdev et al. |
| 2008/0131634 A1* | 6/2008 | Kiuchi et al. ............... 428/34.9 |
| 2008/0311388 A1* | 12/2008 | Uesugi et al. ............... 428/332 |
| 2010/0219507 A1 | 9/2010 | Misumi et al. |
| 2010/0289158 A1 | 11/2010 | Hong et al. |
| 2012/0202337 A1* | 8/2012 | Kim et al. ................... 438/458 |

FOREIGN PATENT DOCUMENTS

| | | |
|---|---|---|
| CN | 1916097 A1 | 2/2007 |
| CN | 101514238 A | 8/2009 |
| KR | 10-0647132 B1 | 11/2006 |
| KR | 10-2008-0103752 A | 11/2008 |
| KR | 10-2009-0121254 A | 11/2009 |
| KR | 10-2011-0109938 A | 10/2011 |
| WO | 2010/147363 A2 | 12/2010 |
| WO | WO 2010-147363 A2 * | 12/2010 |

OTHER PUBLICATIONS

H.W. Melville, Proceedings of the Royal Society of London, Series A, Mathematical and Physical Sciences, V. 167, N. 928 (1938) 99-121.*
Supplementary European Search report issued in European Appln. No. 12746591.2 on Jun. 4, 2014, 6 pages.
Office Action issued by the State Intellectual Property Office of China in corresponding application No. CN 201280018256, dated Feb. 10, 2015, 18 pages.
International Search Report issued in International Application No. PCT/KR2012/001112 dated Sep. 21, 2012, 2 pages.

* cited by examiner

*Primary Examiner* — Roberto Rabago
(74) *Attorney, Agent, or Firm* — Rothwell, Figg, Ernst & Manbeck, P.C.

(57) ABSTRACT

Provided are a solventless composition and a method of preparing the same. Here, the solventless composition may effectively manufacture a film that is uniform without substantial deviation in thickness and has a large but uniform thickness or an excellent physical property such as thermal resistance during manufacture of a film. In addition, the composition of the present invention does not induce contamination during the manufacture of the film. Furthermore, by preventing gelation or phase separation of components of the composition, the composition capable of manufacturing a substrate film having an excellent physical property such as optical transparency, thermal resistance and dimension stability may be provided.

17 Claims, No Drawings

SOLVENTLESS COMPOSITION AND METHOD FOR PREPARING THE SAME

CROSS REFERENCE TO RELATED APPLICATIONS

The present application is a continuation of International Application No. PCT/KR2012/001112 filed on Feb. 14, 2012, which claims priority to and the benefit of Korean Patent Application No. 10-2011-0012987 filed on Feb. 14, 2011 and of Korean Patent Application No. 10-2012-0014764 filed on Feb. 14, 2012, the disclosures of which are incorporated herein by reference in their entireties.

TECHNICAL FIELD

The present invention relates to a solventless composition and a method of preparing the same.

BACKGROUND ART

A pressure-sensitive adhesive product such as a pressure-sensitive adhesive film may have various uses such as a protective film, an advertisement film, a cleaning sheet, a reflective sheet, a structural pressure-sensitive adhesive sheet, a pressure-sensitive adhesive sheet for a photograph, a pressure-sensitive adhesive sheet for displaying a traffic line, an optical pressure-sensitive adhesive product, a pressure-sensitive adhesive product for an electronic part or a medical patch.

Such a pressure-sensitive adhesive film may include various kinds of plastic films as a substrate. The plastic film is conventionally manufactured by melting a thermoplastic resin and applying the melted resin to a T-shaped die, extrusion or calendaring method.

However, a projecting part so called as a fish eye is frequently formed on the substrate film prepared by a conventional method, the film has a non-uniform thickness, and there is significant variation in physical properties according to an axis direction, which limits application of the substrate film.

DISCLOSURE

Technical Problem

The present invention is directed to providing a solventless composition and a method of preparing the same.

Technical Solution

One aspect of the present invention relates to a solventless composition for manufacturing a film to manufacture a substrate film. The solventless composition may include a (meth)acrylic polymer component having a (meth)acrylic acid ester-based monomer as a polymerization unit and a photoreactive group on a side chain or terminal end thereof, and a monomer component having a high glass transition temperature. The (meth)acrylic polymer component of the solventless composition has a low glass transition temperature, and may include unreacted (meth)acrylic acid ester-based monomers in a partially polymerized state.

Such a solventless composition for manufacturing a film may provide a cured product having a glass transition temperature of −20° C. (250K) or more after curing, and such a cured product may provide suitable physical properties for the substrate film.

As an example of a film capable of being manufactured by applying the solventless composition, a substrate of the pressure-sensitive adhesive film, for example, a protective film to protect or fix a wafer during wafer processing may be used. Particularly, the solventless composition of the present invention may be effectively applied to manufacture a film requiring optical transparency and/or uniform of thickness is excellent though it is thick.

Hereinafter, the composition of the present invention will be described in detail.

The composition of the present invention is a type of solventless, meaning that is does not include a solvent such as an organic or aqueous solvent. Since the composition does not include a solvent, efficiency of a process of manufacturing a film may be increased, and a uniform film that does not deviate substantially in thickness may be manufactured. In addition, by excluding a solvent, generation of bubbles or degradation in leveling caused by volatilization of a solvent may be prevented, and in some cases, a substrate film having a large but uniform thickness may be effectively manufactured. In addition, since the volatilization of a solvent is not required, contamination may not occur during the process.

The composition of the present invention includes a (meth)acrylic polymer component including a (meth)acrylic acid ester-based monomer as a polymerization unit and having a photoreactive group on a side chain or terminal end thereof. Due to the photoreactive group, optical characteristics of the substrate film manufactured from the composition are enhanced, and physical properties are also enhanced as a gel fraction is increased.

In one example, the (meth)acrylic polymer component included in the solventless composition may be prepared by bulk polymerization, particularly partial polymerization according to the bulk polymerization. That is, a part of the monomers used in the bulk polymerization may remain in a state of an unreacted monomer. For example, the polymer component may include a bulk polymerization product of the (meth)acrylic acid ester-based monomer and a copolymerizable monomer having a first reactive group; and a compound bound with the first reactive group in the bulk polymerization product to provide a photoreactive group.

In one example, when the monomer mixture including the (meth)acrylic acid ester-based monomer and the copolymerizable monomer having the first reactive group is partially polymerized, some monomers included in the monomer mixture may be polymerized, thereby forming a polymer component, and the others may be included in the composition without being polymerized. In the present invention, as needed, after the bulk polymerization, a monomer may be further blended into the polymerization product. By including the copolymerizable monomer as a polymerization unit, and introducing the photoreactive group to the polymer component including the first reactive group on a side chain or terminal end thereof by means of the first reactive group, the polymer component having a photoreactive group on the side chain or terminal end thereof may be prepared. Here, the photoreactive group may be introduced by a method of reacting a compound simultaneously having a functional group (hereinafter, also referred to as "second reactive group") capable of reacting with the first reactive group and a photoreactive group with the bulk polymerization product.

The term "polymer component" used herein may refer to a high molecular weight component including at least two monomers in a polymerized form, for example, a component such as an oligomer or polymer component. In addition, the polymer component also includes a partially polymerized monomer, and it is understood that the component also includes an unreacted monomer component.

In addition, here, the photoreactive group may refer to all functional groups capable of being polymerized or cross-linked by electromagnetic radiation, and an example of the functional group may be, but is not limited to, a (meth)acryloyl group.

Here, the electromagnetic radiation may refer to microwaves, IR rays, UV rays, X rays, γ rays, or a particle beam such as an α-particle beam, a proton beam, a neutron beam or an electron beam, and in one example, it may be UV rays. The composition of the present invention may include a polymer component having a photoreactive group, thereby becoming a photocurable composition.

The (meth)acrylic acid ester-based monomer included in the monomer mixture may be, but is not particularly limited to, for example, a (meth)acrylic acid alkyl ester. The (meth)acrylic acid alkyl ester may include one or at least two of (meth)acrylic acid alkyl esters having carbon atoms 1 to 14 alkyl groups such as methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylbutyl (meth)acrylate, 2-ethylhexyl (meth)acrylate, n-octyl (meth)acrylate, isooctyl (meth)acrylate, isononyl (meth)acrylate, lauryl (meth)acrylate and tetradecyl (meth)acrylate. In addition, as the (meth)acrylic acid ester-based monomer, a monomer having a high glass transition temperature such as isobornyl acrylate may be included.

In addition, here, the copolymer monomer having a first reactive group may be, for example, a monomer capable of being copolymerized with the (meth)acrylic acid ester-based monomer, which may provide a first reactive group to a side chain or terminal end of a polymer after polymerization. Such a first reactive group may be, but is not limited to, at least one selected from the group consisting of a hydroxyl group, a carboxyl group, an isocyanate group, an amino group and an epoxy group, and in one exemplary embodiment of the present invention, the first reactive group may be a hydroxyl group or a carboxyl group, but the present invention is not limited thereto. In the art, various monomers copolymerized with a (meth)acrylic acid ester-based monomer, thereby providing such a reactive group to the polymer, are known, and may be used without limitation. For example, a copolymerizable monomer having a hydroxyl group as a first reactive group may be 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethyleneglycol (meth)acrylate or 2-hydroxypropyleneglycol (meth)acrylate, and a copolymerizable monomer having a carboxyl group as a first reactive group may be (meth)acrylic acid, 2-(meth)acryloyloxy acetic acid, 3-(meth)acryloyloxy propylic acid, 4-(meth)acryloyloxy butyric acid, acrylic acid dimer, itaconic acid, maleic acid or maleic anhydride.

The monomer mixture may include, for example, 70 to 99 parts by weight of a (meth)acrylic acid ester-based monomer and 1 to 30 parts by weight of a copolymerizable monomer having a first reactive group. The unit "parts by weight" used herein is a weight ratio. By controlling the weight ratio between the monomers as described above, curability of the composition may be excellently maintained, and a phenomenon of decreasing transparency of the composition or a cured product thereof due to phase separation occurring in the composition may be prevented.

In the monomer mixture, at least one (meth)acrylic ester-based monomer may be used, and particularly, in the solventless composition of the present invention, a predetermined content of the monomer (e.g., isobornyl acrylate, methylmethacrylate, etc.) having a high glass transition temperature may be included in the (meth)acrylic polymer. Here, the (meth)acrylic acid ester-based monomer having a high glass transition temperature may be included at 10 to 60 parts by weight, relative to 100 parts by weight of the monomer mixture.

The monomer mixture may further include another functional monomer, besides the above-described monomer, as needed.

Such a functional monomer may be added to control physical properties such as a glass transition temperature of the composition or a cured product thereof, or to provide other functionalities, and may be, for example, a nitrogen-containing monomer such as acrylonitrile, (meth)acrylamide, N-methyl (meth)acrylamide or N-butoxy methyl (meth)acrylamide; an aromatic group-containing monomer such as styrene, methyl styrene, benzyl (meth)acrylate or phenoxyethyl (meth)acrylate; a carboxylic acid vinyl ester such as vinyl acetate; an alkoxy group-containing monomer such as 2-(2-ethoxyethoxy)ethyl (meth)acrylate; or a heterocyclic residue-containing monomer such as tetrahydrofurfuryl (meth)acrylate or (meth)acryloyl morpholine. Such a monomer may be included in the monomer mixture in a suitable ratio according to a desired use.

In addition, when the monomer mixture is partially polymerized, a degree of partial polymerization is not particularly limited, and may be controlled according to a purpose. For example, the degree of partial polymerization may be controlled in a range capable of satisfying the following viscosity range.

A compound providing a photoreactive group to a polymer component may be bound to the first reactive group, and may be a compound simultaneously including a second functional group capable of binding to the first reactive group and the photoreactive group. Here, examples of the second reactive group may include, but are not limited to, an isocyanate group, an epoxy group, a silane group and a carboxyl group. For example, when the first reactive group is a hydroxyl group or a carboxyl group, the second reactive group may be an isocyanate group, an epoxy group or a halosilane group, when the first reactive group is an amino group, the second reactive group may be an isocyanate group, and when the first reactive group is an epoxy group, the second reactive group may be a carboxyl group.

In one example, as described above, the compound including a second reactive group to provide a photoreactive group to the polymer component may be one or at least two compounds of a compound represented by Formula 1; a compound represented by Formula 2; a compound represented by Formula 3; a reaction product of a multifunctional isocyanate compound and a compound represented by Formula 4; and a reaction product of a multifunctional isocyanate compound, a polyol compound and the compound of Formula 4.

[Formula 1]

$R_1$—NCO

[Formula 2]

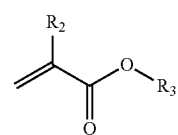

-continued

Si(R$_4$)$_n$(R$_5$)$_m$(R$_6$)$_l$ [Formula 3]

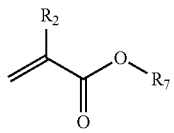
[Formula 4]

In Formulas 1 to 4, R$_1$ is an alkyl group substituted with a (meth)acryloxy group; an alkyl group substituted with a (meth)acryloxyalkyl group; an alkyl group substituted with an alkenylphenyl group; a (meth)acryloyl group; a (meth)acryloxy group or an alkenyl group, R$_2$ is a hydrogen or an alkyl group, R$_3$ is a hydrogen or a glycidyl group, R$_4$ is a (meth)acryloxyalkyl group, R$_5$ is a halogen atom, R$_6$ is an alkyl group, n+m+1 is 4, n and m are each independently 1 to 3, and R$_7$ is a hydroxyalkyl group.

In the definitions of Formulas 1 to 4, the alkyl group may be an alkyl group having 1 to 20, 1 to 16, 1 to 12, 1 to 8 or 1 to 4 carbon atoms, the alkenyl group may be an alkenyl group having 2 to 20, 2 to 16, 2 to 12, 2 to 8 or 2 to 4 carbon atoms, for example, a vinyl group, an allyl group or an isoprophenyl group, and the halogen atom may be, for example, a chlorine atom.

Specifically, the compound may be, but is not limited to, one or at least two of 2-isocyanatoethyl (meth)acrylate, 1,1-bis(acryloyloxymethyl)ethyl isocyanate, (meth)acryloyloxy ethyl isocyanate, meth-isoprophenyl-α,α-dimethylbenzylisocyanate, methacryloyl isocyanate; vinyl isocyanate; allyl isocyanate; an acryloyl monoisocyanate compound obtained by reacting a diisocyanate compound or a polyisocyanate compound with (meth)acrylic acid 2-hydroxyethyl; an acryloyl monoisocyanate compound obtained by reacting a diisocyanate compound or polyisocyanate compound, a polyol compound and (meth)acrylic acid 2-hydroxyethyl; (meth)acrylic acid glycidyl; (meth)acrylic acid; and 3-methacryloxypropyldimethylchlorosilane.

Such a compound may be included in a ratio of 1 to 200 equivalent weight, relative to 100 equivalent weight of the first reactive group, so that the curability of the composition may be excellently maintained and the phenomenon of decreasing transparency due to phase separation occurring in the composition may be prevented.

The solventless composition used in the manufacture of the substrate film of the present invention further includes a monomer component having a high glass transition temperature in addition to the (meth)acrylic polymer component to have physical properties of the substrate film after curing. That is, the composition may provide a cured product having a glass transition temperature of −20° C. (250K) after curing by further including a monomer component having a relatively high glass transition temperature in the (meth)acrylic polymer component having a relatively low glass transition temperature.

The monomer component having a high glass transition temperature may be a monomer having a glass transition temperature of 20° C. to 100° C., and the (meth)acrylic polymer component may have a glass transition temperature of −50° C. to 0° C.

The monomer component having a high glass transition temperature may be at least one selected from the group consisting of isobornyl acrylate, cyclohexyl acrylate, methyl methacrylate, and styrene.

The monomer component having a high glass transition temperature may be included at 35 to 300 or 50 to 200 parts by weight, relative to 100 parts by weight of the (meth) acrylic polymer component. By controlling the glass transition temperature of the monomer component as described above, the glass transition temperature of the substrate film, which is a cured product of the composition may be controlled.

The composition used to manufacture the substrate film of the present invention may further include a multifunctional acrylate or an acrylate-based oligomer. Such a component may be added to increase a crosslinking density of the cured product and control physical properties such as hardness, toughness, or glass transition temperature. The composition of the present invention may include a polymer component having a photoreactive group on a side chain or terminal end thereof, and therefore, even when a component having at least two double bonds in the molecule, like the multifunctional acrylate or acrylate oligomer, is further blended, a problem caused by gelation or phase separation of the composition may not occur.

As the multifunctional acrylate, any one having at least two (meth)acryloyl groups in a molecule may be used without limitation. For example, the multifunctional acrylate may be, but is not limited to, a bifunctional acrylate such as 1,4-butanediol di(meth)acrylate, 1,6-hexanediol di(meth) acrylate, neopentylglycol di(meth)acrylate, polyethyleneglycol di(meth)acrylate, neopentylglycol adipate di(meth)acrylate, hydroxypivalic acid neopentylglycol di(meth) acrylate, dicyclopentanyl di(meth)acrylate, caprolactone-modified dicyclopentenyl di(meth)acrylate, ethyleneoxide-modified di(meth)acrylate, di(meth)acryloxy ethyl isocyanurate, allylated cyclohexyl di(meth)acrylate, tricyclodecanedimethanol (meth)acrylate, dimethylol dicyclopentane di(meth)acrylate, ethyleneoxide-modified hexahydrophthalic acid di(meth)acrylate, tricyclodecane dimethanol(meth)acrylate, neopentylglycol-modified trimethylpropane di(meth)acrylate, adamantane di(meth)acrylate, or 9,9-bis[4-(2-acryloyloxyethoxy)phenyl]fluorine; a trifunctional acrylate such as trimethylolpropane tri(meth) acrylate, dipentaerythritol tri(meth)acrylate, propionic acid-modified dipentaerythritol tri(meth)acrylate, pentaerythritol tri(meth)acrylate, propyleneoxide-modified trimethylolpropane tri(meth)acrylate, trifunctional urethane (meth)acrylate, or tris(meth)acryloxyethylisocyanurate; a tetrafunctional acrylate such as diglycerin tetra(meth)acrylate or pentaerythritol tetra(meth)acrylate; a pentafunctional acrylate such as propionic acid-modified dipentaerythritol penta (meth)acrylate; or a hexafunctional acrylate such as dipentaerythritol hexa(meth)acrylate, caprolactone-modified dipentaerythritol hexa(meth)acrylate, or urethane (meth) acrylate (e.g. a reaction product of an isocyanate monomer and trimethylolpropane tri(meth)acrylate).

In addition, as the acrylate oligomer, a conventional photoreactive oligomer known in the art such as urethane acrylate, polycarbonate acrylate, ester acrylate, ether acrylate or epoxy acrylate may be used, but the present invention is not limited thereto.

The multifunctional acrylate or acrylate oligomer may be included in the composition at 500 parts by weight or less, or 0.5 to 300 parts by weight, relative to on 100 parts by weight of the above-described (meth)acrylic polymer component, and as needed, the content may be changed according to process efficiency or physical properties of a desired film.

The composition of the present invention may further include a photoinitiator, and a polymerization degree may be controlled according to an amount of the photoinitiator used.

As the photoinitiator, any one capable of initiating a polymerization, crosslinking or curing reaction may be used without limitation.

A kind of the photoinitiator is not particularly limited, and may be, but is not limited to, for example, an α-hydroxyketone-based compound (e.g., IRGACURE 184, IRGACURE 500, IRGACURE 2959, or DAROCUR 1173; Ciba Specialty Chemicals); a phenylglyoxylate-based compound (e.g., IRGACURE 754, DAROCUR MBF; Ciba Specialty Chemicals); a benzyldimethylketal-based compound (e.g., IRGACURE 651; Ciba Specialty Chemicals); an α-aminoketone-based compound (e.g., IRGACURE 369, IRGACURE 907, IRGACURE 1300; Ciba Specialty Chemicals); a monoacylphosphine-based compound (MAPO) (e.g., DAROCUR TPO; Ciba Specialty Chemicals); a bisacylphosphene-based compound (BAPO) (e.g., IRGACURE 819, IRGACURE 819DW1; Ciba Specialty Chemicals); a phosphineoxide-based compound (e.g., IRGACURE 2100; Ciba Specialty Chemicals); a metalocene-based compound (e.g., IRGACURE 784; Ciba Specialty Chemicals); an iodonium salt (e.g., IRGACURE 250; Ciba Specialty Chemicals); and a mixture of at least one thereof (e.g., DAROCUR 4265, IRGACURE 2022, IRGACURE 1300, IRGACURE 2005, IRGACURE 2010, IRGACURE 2020; Ciba Specialty Chemicals), which may be used alone or in combination of at least two thereof.

In the present invention, the photoinitiator may be included at 0.01 to 20 parts by weight, relative to 100 parts by weight of the (meth)acrylic polymer component described above, but this may be changed in consideration of a process efficiency or physical properties of the cured product.

The composition may further include at least one additive selected from the group consisting of a dye, a pigment, an epoxy resin, a crosslinking agent, a UV stabilizer, an antioxidant, a coloring agent, a reinforcing agent, a filler, a foaming agent, a surfactant, a photo thickening agent and a plasticizer, as needed.

The solventless composition used to manufacture a substrate film of the present invention may have a viscosity of 500 to 30,000 or 800 to 20,000 cps at 25C. By controlling the viscosity of the composition in the above range, the process efficiency and the physical properties after curing may be effectively maintained.

In the present invention, the composition may have a gel fraction of 80% to 100% or 90% to 100% after curing. Here, the after-curing state refers to a state in which the composition of the present invention is manufactured in the substrate film through light radiation. In addition, the gel fraction may be measured by Equation 1:

$$\text{Gel fraction (\%)} = B/A \times 100 \quad \text{[Equation 1]}$$

In Equation 1, A is a weight of the composition after curing, and B is a dry weight of an insoluble content when the composition after curing is precipitated in ethyl acetate for 48 hours at room temperature.

In the present invention, the composition may also have a glass transition temperature (Tg) after curing of −20° C. to 45° C., for example, −20° C. to 40° C., −20° C. to 0° C., −10° C. to 40° C., −5° C. to 40° C., 0° C. to 35° C. or 0° C. to 30° C.

The glass transition temperature may be measured using a differential scanning calorimeter (DSC). In addition, in the present invention, when at least two glass transition temperatures are measured in the DSC measurement, an average value considering each component of the composition is determined a representative value of the glass transition temperature. By controlling the glass transition temperature as described above, stress relaxation of the film (cured product of the composition) may be excellently maintained.

The solventless composition for manufacturing a film of the present invention may be prepared by the following method.

Another aspect of the present invention provides a method of preparing the composition according to an exemplary embodiment, which includes: preparing a bulk polymerization product including a (meth)acrylic acid ester-based monomer as a polymerization unit, and also including a (meth)acrylic polymer component including a first reactive group on a side chain or terminal end thereof and a monomer component; introducing a photoreactive group to the bulk polymerization product by mixing the bulk polymerization product and a compound having a second reactive group capable of reacting with the first reactive group and the photoreactive group; and further mixing a monomer component having a high glass transition temperature in the bulk polymerization product to which the photoreactive group is introduced.

Here, the operation of preparing a bulk polymerization product may include partially polymerizing a monomer mixture including a (meth)acrylic acid ester-based monomer and a copolymerizable monomer having a first reactive group, and in another example, may include bulk polymerizing a monomer mixture including a (meth)acrylic acid ester-based monomer and a copolymerizable monomer having a first reactive group, and further blending a monomer into the bulk polymerization product.

A kind and a weight ratio of the monomer capable of being used in the polymerization operation are described above.

In addition, the method of bulk polymerizing the monomer mixture is not particularly limited either, and thus the monomer mixture may be polymerized by heat or UV rays. In addition, a polymerization degree may be selected in consideration of a desired physical property such as a viscosity of the composition.

The operation of bulk polymerizing the monomer mixture may be terminated by adding oxygen, and a termination speed may be increased by decreasing a temperature or further adding the monomer mixture.

In the present invention, after the polymerization operation, an operation of mixing the polymerized monomer mixture with a compound binding to the reactive group to provide a photoreactive group may be performed, and as needed, an operation of reacting the compound capable of providing the photoreactive group with a first reactive group present in the polymerization product may be further performed. In this case, a condition of the reaction is not particularly limited, and the mixture may be reacted at room temperature to 40° C. at a normal pressure for 4 to 48 hours. Here, the reaction may be performed under the presence of a catalyst such as organic tin.

Subsequently, the solventless composition for manufacturing a film according to the present invention may be prepared by further mixing a monomer component having a high glass transition temperature into the reaction product including the (meth)acrylic polymer component into which the photoreactive group is introduced to a side chain or terminal end thereof.

Still another aspect of the present invention provides a method of manufacturing a film including coating the solventless composition of the present invention described above and curing the coated composition.

As the film is manufactured by the above-described method in the preset invention, a protrusion such as a fish eye on the film may be prevented, and the film may have a uniform thickness.

A method of casting the solventless composition may be, but is not particularly limited to, bar coating, knife coating, roll coating, spray coating, gravure coating, curtain coating, comma coating or lip coating according to a desired thickness.

Curing of the coated composition after the coating may be performed by electromagnetic radiation using, for example, UV rays. In this case, a method of radiating electromagnetic waves to the composition is not particularly limited, and may employ a means known in the art. For example, when the present invention employs a UV radiation method, a metal halide lamp, a high pressure mercury lamp, a black light lamp, an induction lamp or a xenon lamp may be used. In addition, here, a condition for irradiation with UV rays may be selected in consideration of a component ratio of the composition or a desired curing degree, without particular limitation.

Yet another aspect of the present invention provides a pressure-sensitive adhesive film including a substrate film and a pressure-sensitive adhesive layer formed on the substrate film, and here, the substrate film includes the composition according to the present invention described above in a cured state.

The pressure-sensitive adhesive film of the present invention may have various uses such as a protective film in processing a semiconductor wafer, an advertisement film, a cleaning sheet, a reflective sheet, a structural pressure-sensitive adhesive sheet, a pressure-sensitive adhesive sheet for a photograph, a pressure-sensitive adhesive sheet for displaying a traffic line, an optical pressure-sensitive adhesive product, a pressure-sensitive adhesive product for an electronic part or a medical patch, and particularly, a protective film in processing of a semiconductor wafer.

In the present invention, the method of manufacturing a pressure-sensitive adhesive film is not particularly limited. For example, the method of the present invention described above may be sequentially applied to form a substrate film and a pressure-sensitive adhesive film, or the pressure-sensitive adhesive film may be manufactured by laminating a substrate film and a pressure-sensitive adhesive layer, which are separately manufactured. Here, the kind of a pressure-sensitive adhesive layer is not particularly limited, and a general pressure-sensitive adhesive layer known in the art may be used.

Advantageous Effects

In the present invention, a solventless composition capable of effectively manufacturing a uniform film that does not deviate substantially in thickness, has a large and uniform thickness or has an excellent physical property such as thermal resistance can be provided. In addition, the composition of the present invention does not induce contamination during manufacturing of the film. In addition, in the present invention, by preventing gelation or phase separation of components of the composition, a syrup capable of manufacturing a film having an excellent physical property such as optical transparency can be provided.

MODES FOR INVENTION

Hereinafter, exemplary embodiments of the present invention will be described in detail. However, the present invention is not limited to the exemplary embodiments disclosed below, but can be implemented in various forms. The exemplary embodiments are provided for complete disclosure of the present invention and to enable those of ordinary skill in the art to embody and practice the present invention.

EXAMPLE 1

Preparation of Solventless Composition 75 parts by weight of ethylhexyl acrylate (EHA), 20 parts by weight of isobornyl acrylate (IBOA), and 5 parts by weight of hydroxyethyl acrylate (HEA) were input as monomers into a 4-neck glass reaction vessel equipped with a stirrer, a nitrogen gas introduction tube, a temperature sensor and a condenser. Subsequently, 120 ppm of n-dodecyl mercaptan (n-DDM) as a chain transfer agent (CTA) and 180 ppm of 2,4-diphenyl-4-methyl-1-pentene (AMSD) were input based on 100 parts by weight of the monomer mixture, and sufficiently mixed at 30° C. for 30 minutes or more while nitrogen was injected into the reaction vessel. Subsequently, a temperature in the reaction vessel was increased to 62° C., and an initiator such as di(2-ethylhexyl)peroxydicarbonate (EHPDC) was input at a concentration of 150 ppm to initiate a reaction. Afterward, when a temperature of a reaction system increased to 80° C. due to heat generated by the reaction, oxygen was input, 20 parts by weight of the monomer mixture (EHA:IBOA:HEA=75:20:5) formed in the same composition as described above was further input based on 100 parts by weight of the monomer mixture initially input thereto, and the temperature was decreased to 30° C. to terminate the reaction, thereby obtaining a first reaction product. The first reaction product included 34% of a high molecular weight product, which had a weight average molecular weight of 600,000 and a glass transition temperature of −43° C.

Subsequently, 1 equivalent weight of 2-methacryloyloxy ethyl isocyanate (MOI) based on 1 equivalent weight of hydroxyethyl acrylate included in the first reaction product and 1 wt % of a catalyst (dibutyl tin dilaurate; DBTDL) based on the weight of the hydroxyethyl acrylate were blended into the first reaction product and reacted at 40° C. for 24 hours to introduce a photoreactive group to a side chain of the polymer in the first reaction product, thereby obtaining a second reaction product.

Then, 50 parts by weight of an isobornyl acrylate monomer (glass transition temperature: 94° C.) and 1 part by weight of a photoinitiator (Irgacure 819), relative to 100 parts by weight of the monomer mixture initially input were blended, thereby obtaining a solventless composition.

Manufacture of Substrate Film

The solventless composition prepared as described above was coated on a carrier film such as poly(ethylene terephthalate) (PET) to have a thickness of 150 nm using a bar coater, and the PET film was laminated again on the coating layer. Afterward, UV rays (1,000 mJ/cm$^2$) were radiated onto the coating layer using a metal halide lamp while supply of oxygen was interrupted to cure the coating layer, and the PET films on the top and bottom of the coating layer were removed, thereby obtaining a substrate film.

EXAMPLE 2

A process was performed as described in Example 1, except that 100 parts by weight of isobornyl acrylate monomer was blended based on 100 parts by weight of the monomer mixture initially input in Example 1.

EXAMPLE 3

A process was performed as described in Example 1, except that 200 parts by weight of a cyclo hexyl acrylate monomer (glass transition temperature: 18° C.) was blended with respect to 100 parts by weight of the monomer mixture initially input, instead of the isobornyl acrylate monomer in Example 1.

EXAMPLE 4

A process was performed as described in Example 1, except that a reaction amount of MOI was changed into 0.5 equivalent weight during mixing of the secondary reaction product in Example 1.

EXAMPLE 5

A process was performed as described in Example 4, except that a monomer mixture of 73 parts by weight of EHA, 25 parts by weight of IBOA and 2 parts by weight of HEA was used as a monomer mixture of the primary reaction product in Example 4.

EXAMPLE 6

A process was performed as described in Example 5, except that 3 parts by weight of hexanediol diacrylate (HDDA), relative to 100 parts by weight of the composition was further blended into the solventless composition prepared in Example 5.

COMPARATIVE EXAMPLE 1

A process was performed as described in Example 1, except that a solventless composition was prepared by directly mixing an isobornyl acrylate monomer and a photoinitiator without performing an operation of reacting the primary reaction product prepared in Example 1 with MOI.

COMPARATIVE EXAMPLE 2

A process was performed as described in Example 1, except that a solventless composition was prepared by only mixing a photoinitiator without an isobornyl acrylate monomer after the secondary reaction product was prepared in Example 1.

COMPARATIVE EXAMPLE 3

A process was performed as described in Example 1, except that 13 parts by weight of an isobornyl acrylate monomer was blended, relative to 100 parts by weight of the monomer mixture initially input thereto in Example 1.

COMPARATIVE EXAMPLE 4

A process was performed as described in Example 1, except that a monomer mixture of 85 parts by weight of ethylhexyl acrylate (EHA) and 15 parts by weight of hydroxyethyl acrylate (HEA) was used as a monomer mixture of the primary reaction product in Example 1, and 33 parts by weight of an isobornyl acrylate monomer, relative to 100 parts by weight of the monomer mixture initially input was blended.

COMPARATIVE EXAMPLE 5

A process was performed as described in Example 1, except that 50 parts by weight of a 2-ethylhexylacrylate monomer (glass transition temperature: −65° C.) with respect to 100 parts by weight of the monomer mixture initially input was blended, instead of the isobornyl acrylate monomer in Example 1.

COMPARATIVE EXAMPLE 6

A process was performed as described in Comparative Example 1, except that 3 parts by weight of hexanediol diacrylate (HDDA), relative to 100 parts by weight of the composition were further blended into the solventless composition prepared in Comparative Example 1.

COMPARATIVE EXAMPLE 7

Preparation of Solvent-Type Composition 75 parts by weight of EHA, 20 parts by weight of IBOA and 5 parts by weight of HEA were mixed in an ethyl acetate solvent to have a concentration of the monomer mixture of 40 wt %. Subsequently, 400 ppm of a CTA such as n-DDM was further blended and sufficiently mixed at 30° C. for 30 minutes while nitrogen was injected into a 4-neck glass reaction vessel equipped with a stirrer, a nitrogen gas introduction tube, a temperature sensor and a condenser. Afterward, a temperature in the reaction vessel was increased to 62° C., an initiator such as azobisisobutyronitrile (V-60) was input at a concentration of 300 ppm, and polymerization was performed for 5 hours, thereby obtaining a composition.

Manufacture of Substrate Film

A substrate film was manufactured to have a thickness of 150 nm by blending 3 parts by weight of a TDI-based isocyanate curing agent, relative to 100 parts by weight of the solvent-type composition prepared above, coating the resulting mixture on a carrier film, which was a PET film, using a bar coater, and drying the coating layer at 110° C. for 3 minutes.

EXPERIMENTAL EXAMPLE

1. Measurement of Coatability

The presence of linear patterns or bubbles on the surface of the substrate film manufactured in one of Examples 1 to 6 and Comparative Examples 1 to 7 was observed with the naked eye, and the results are shown in Tables 1 and 2.
 ○: no linear patterns or bubbles (excellent coatability)
 x: linear patterns or bubbles (poor coatability)

2. Measurement of Haze

The substrate films manufactured according to Examples 1 to 6 and Comparative Examples 1 to 7 were observed with the naked eye to determine the presence of a haze, and results are shown in Tables 1 and 2.
 ○: the film was transparent
 x: the film was not transparent 3. Measurement of Glass Transition Temperature (Tg)

A glass transition temperature of each of the substrate films manufactured according to Examples 1 to 6 and Comparative Examples 1 to 7 was measured using a DSC thermogravimetric system, and results are shown in Tables 1 and 2.

4. Measurement of Gel Fraction

A gel fraction of each of the substrate films manufactured according to Examples 1 to 6 and Comparative Examples 1 to 7 was measured by the following method. The manufactured substrate film was cut into a size of 4 cm×4 cm to measure a weight (A of Equation 1), and immersed in ethyl acetate at room temperature (approximately 25° C.) for 24 hours. Afterward, an insoluble substrate was taken and dried at 150° C. for 30 minutes, and ethyl acetate present in the insoluble content was removed. Then, a weight of the resulting material (B of Equation 1) was measured. Subsequently, the measured weight was assigned to Equation 1, and results are shown in Tables 1 and 2.

In contrast, in Comparative Examples 1 and 6, since a photoreactive group was not present, a haze was generated in the film due to phase separation in the manufacture of the film, and in Comparative Examples 2 to 5, due to a low glass transition temperature, the film did not have satisfactory physical properties, and could not be used as a substrate film. In addition, in Comparative Example 7, when the composition was coated to a large thickness of 150 μm, it was confirmed that bubbles were generated in the coating layer.

In addition, the substrate film according to Examples had a high gel fraction of 80% or more, thereby having excellent thermal resistance, was optically transparent, and could sufficiently serve as a substrate. However, in the Comparative Examples, since the film could not have a high gel fraction, the thermal resistance was significantly decreased, and thus the film was difficult to use as a substrate, or even

TABLE 1

|  |  | Example | | | | | |
|---|---|---|---|---|---|---|---|
|  |  | 1 | 2 | 3 | 4 | 5 | 6 |
| Monomer composition of primary reaction product | EHA | 75 | 75 | 75 | 75 | 73 | 73 |
|  | IBOA | 20 | 20 | 20 | 20 | 25 | 25 |
|  | HEA | 5 | 5 | 5 | 5 | 2 | 2 |
| Equivalent weight of photoreactive group |  | 1 | 1 | 1 | 0.5 | 0.5 | 0.5 |
| High Tg monomer | Kind | IBOA | IBOA | CHA | IBOA | IBOA | IBOA |
|  | Content | 50 | 100 | 200 | 50 | 50 | 50 |
| HDDA |  | — | — | — | — | — | 3 |
| Coatability |  | ○ | ○ | ○ | ○ | ○ | ○ |
| Haze |  | ○ | ○ | ○ | ○ | ○ | ○ |
| Gel fraction (%) |  | 95 | 93 | 93 | 93 | 92 | 97 |
| Glass transition temperature (° C.) |  | −11 | 18 | −5 | −11 | −11 | −7 |

EHA: 2-ethylhexylacrylate,
IBOA: isobornyl acrylate,
CHA: cyclohexyl acrylate,
HEA: 2-hydroxyethylacrylate, equivalent weight of photoreactive group: an equivalent weight ratio based on an equivalent weight of a copolymerizable monomer (HEA) having a reactive group,
HDDA: parts by weight of hexane diol diacrylate based on 100 parts by weight of the composition

TABLE 2

|  |  | Comparative Example | | | | | | |
|---|---|---|---|---|---|---|---|---|
|  |  | 1 | 2 | 3 | 4 | 5 | 6 | 7 |
| Monomer composition of primary reaction product | EHA | 75 | 75 | 75 | 85 | 75 | 75 | 75 |
|  | IBOA | 20 | 20 | 20 | — | 20 | 20 | 20 |
|  | HEA | 5 | 5 | 5 | 15 | 5 | 5 | 5 |
| Equivalent weight of photoreactive group |  | — | 1 | 1 | 1 | 1 | — | — |
| High Tg monomer (content) |  | IBOA (50) | — | IBOA (13) | IBOA (33) | — | IBOA (50) | — |
| Low Tg monomer (content) |  | — | — | — | — | EHA (50) | — | — |
| TDI curing agent |  | — | — | — | — | — | — | 3 |
| HDDA |  | — | — | — | — | — | 3 | — |
| Coatability |  | ○ | ○ | ○ | ○ | ○ | ○ | x |
| Haze |  | x | ○ | ○ | ○ | ○ | x | ○ |
| Gel fraction (%) |  | 2 | 93 | 93 | 93 | 94 | 78 | 91 |
| Glass transition temperature (° C.) |  | −11 | −43 | −34 | −30 | −49 | −11 | −43 |

As seen from the results of Tables 1 and 2, all of the substrate films of Examples according to the present invention had excellent coatability and film formability, and particularly, even though a film having a large thickness of 150 μm was manufactured, the film had excellent coatability and did not have a haze.

though the film had a high gel fraction, due to a low glass transition temperature, the film could not serve as a substrate.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A solventless composition for manufacturing a film, comprising:
   a (meth)acrylic polymer component including a (meth)acrylic acid ester-based monomer as a polymerization unit, and having a photoreactive group on a side chain or terminal end thereof; and
   a monomer component having a glass transition temperature in a range from 20° C. to 100° C.,
   wherein the (meth)acrylic polymer component comprises:
   a bulk polymerization product of a monomer mixture comprising a (meth)acrylic acid ester-based monomer and a copolymerizable monomer having a first reactive group; and
   a compound providing the photoreactive group, wherein the compound providing the photoreactive group is not present in the bulk polymerization product of a monomer mixture;
   wherein the first reactive group is selected from the group consisting of a hydroxyl group, a carboxyl group, an isocyanate group, an amino group and an epoxy group;
   wherein the (meth)acrylic polymer component has a glass transition temperature in a range from −50° C. to 0° C.; and
   wherein as a solventless composition for manufacturing a film in a partially polymerized state, the solventless composition for manufacturing a film provides a cured product having a glass transition temperature of −20 ° C. (250K) or more after curing.

2. The solventless composition for manufacturing a film of claim 1, wherein the photoreactive group is a (meth)acryloyl group.

3. The solventless composition for manufacturing a film of claim 1, wherein the (meth)acrylic acid ester-based monomer comprises a (meth)acrylic acid alkyl ester.

4. The solventless composition for manufacturing a film of claim 1, wherein monomer mixture comprises 70 to 99 parts by weight of the (meth)acrylic acid ester-based monomer and 1 to 30 parts by weight of the copolymerizable monomer having a first reactive group.

5. The solventless composition for manufacturing a film of claim 1, wherein the compound providing a photoreactive group is at least one compound selected from the group consisting of a compound of Formula 1; a compound of Formula 2; a compound of Formula 3; a reaction product of a multifunctional isocyanate compound and a compound of Formula 4; and a reaction product of a multifunctional isocyanate compound, a polyol compound and the compound of Formula 4:

$R_1$—NCO [Formula 1]

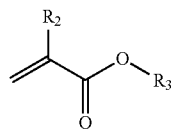

[Formula 2]

$Si(R_4)_n(R_5)_m(R_6)_l$ [Formula 3]

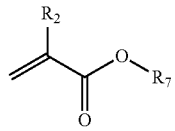

[Formula 4]

where $R_1$ is an alkyl group substituted with a (meth)acryloxy group, a (meth)acryloxyalkyl group or an alkenylphenyl group; a (meth)acryloyl group; a (meth)acryloxy group; or an alkenyl group, $R_2$ is hydrogen or an alkyl group, $R_3$ is hydrogen or a glycidyl group, $R_4$ is a (meth)acryloxyalkyl group, $R_5$ is a halogen atom, $R_6$ is an alkyl group, n+m+l is 4, n and m are each independently 1 to 3, and $R_7$ is a hydroxyalkyl group.

6. The solventless composition for manufacturing a film of claim 1, wherein the compound providing a photoreactive group is comprised at 1 to 200equivalent weight, relative to 100 equivalent weight of the reactive group in the polymerization product.

7. The solventless composition for manufacturing a film of claim 1, wherein the monomer component having a glass transition temperature in a range from 20° C. to 100° C. is isobornyl acrylate, methylmethacrylate or styrene.

8. The solventless composition for manufacturing a film of claim 1, wherein the monomer component having a glass transition temperature in a range from 20° C. to 100° C. is comprised of 35 to 300 parts by weight, relative to 100 parts by weight of the (meth)acrylic polymer component.

9. The solventless composition for manufacturing a film of claim 1, further comprising:
   a multifunctional acrylate or an acrylate-based oligomer.

10. The solventless composition for manufacturing a film of claim 9, wherein the multifunctional acrylate or the acrylate-based oligomer is comprised at 500 parts by weight or less, relative to 100 parts by weight of the (meth)acrylic polymer component.

11. The solventless composition for manufacturing a film of claim 1, further comprising:
    a photoinitiator.

12. The solventless composition for manufacturing a film of claim 1, which has a viscosity of 500 to 30,000 cps at 25° C.

13. The solventless composition for manufacturing a film of claim 1, which has a gel fraction of 80% to 100% after curing.

14. A method of preparing the solventless composition for manufacturing a film of claim 1, comprising:
   (a) preparing a bulk polymerization product comprising a (meth)acrylic acid ester-based monomer as a polymerization unit, and also comprising a (meth)acrylic polymer component having a first reactive group on a side chain or terminal end thereof and a monomer component;
   (b) introducing a photoreactive group to the bulk polymerization product by mixing the bulk polymerization product and a compound having a second reactive group capable of reacting with the first reactive group and the photoreactive group; and
   (c) mixing further a monomer component having a glass transition temperature in a range from 20° C. to 100° C. with the bulk polymerization product obtained from step (b).

15. The method of preparing a solventless composition for manufacturing a film of claim 14, wherein the operation of preparing a bulk polymerization product comprises partially polymerizing a monomer mixture comprising a (meth)acrylic acid ester-based monomer and a copolymerizable monomer having a first reactive group.

16. A method of manufacturing a film, comprising:
coating the solventless composition according to claim 1; and
curing the coated composition.

17. A pressure-sensitive adhesive film, comprising:
a substrate film; and
a pressure-sensitive adhesive film comprising a pressure-sensitive adhesive layer formed on the substrate film,
wherein the substrate film comprises the composition according to claim 1 in a cured state.

* * * * *